United States Patent [19]
Hawkes et al.

[11] Patent Number: 5,147,085
[45] Date of Patent: Sep. 15, 1992

[54] COLD PRESSURE WELDING METHOD AND MACHINE

[75] Inventors: Daniel J. Hawkes; Leslie J. Webb, both of Ashford; Douglas E. Anderson, Canterbury, all of England

[73] Assignee: BWE Limited, Ashford, England

[21] Appl. No.: 576,527

[22] PCT Filed: Mar. 2, 1990

[86] PCT No.: PCT/GB90/00323
§ 371 Date: Oct. 5, 1990
§ 102(e) Date: Oct. 5, 1990

[87] PCT Pub. No.: WO90/09862
PCT Pub. Date: Sep. 7, 1990

[30] Foreign Application Priority Data
Mar. 3, 1989 [GB] United Kingdom ............. 8904859

[51] Int. Cl.5 ............................................. B23K 20/12
[52] U.S. Cl. .................................... 228/115; 228/125; 228/213; 228/3.1; 228/44.3
[58] Field of Search ............. 228/115, 125, 156, 160, 228/201, 212, 213, 3.1, 44.3

[56] References Cited
U.S. PATENT DOCUMENTS

| | | | |
|---|---|---|---|
| 2,863,344 | 12/1958 | Barnes | 228/3.1 |
| 2,886,992 | 5/1959 | Barnes et al. | 228/3.1 |
| 3,106,013 | 10/1963 | Rozmus | 228/904 |
| 3,259,969 | 7/1966 | Tessmann | 228/212 |
| 3,336,655 | 8/1967 | Rozmus | 228/115 |
| 3,340,596 | 9/1967 | Rozmus | 228/115 |
| 3,621,176 | 11/1971 | Valente | 228/125 |
| 3,847,323 | 11/1974 | Good et al. | 228/115 |
| 3,853,258 | 12/1974 | Louw et al. | 228/125 |
| 3,946,928 | 3/1976 | Di Grasso | 228/3.1 |
| 4,014,494 | 3/1977 | Glagolev et al. | 228/3.1 |

*Primary Examiner*—Kurt Rowan
*Assistant Examiner*—Chuck Y. Mah
*Attorney, Agent, or Firm*—Shlesinger, Arkwright & Garvey

[57] ABSTRACT

The machine is provided with a set of two pairs of die halves 60, 62 (FIG. 7) mounted in a framework on hydraulically actuated piston and cylinder assemblies. The die halves 60 and 62 of each pair are relatively radially reciprocable to grip or release a workpiece 102, 104 and the two pairs of die halves are relatively axially reciprocable to effect cold pressure welding together of end portions of the workpieces 102, 104. Adjoining end faces of the die halves are formed with nose portions 100 having inner anvil edges for effecting welding flash removal from the workpieces. In operation, the die halves are moved in sequence to grip the workpieces; to urge the ends of the workpieces together to form a cold pressure weld upset zone; to release the workpieces; to grip one of the workpieces; to urge the gripped workpiece axially relative to a pair of anvil edges to clear flash material from the upset to maintain the cross-sectional area at the weld upset zone substantially constant; and to re-position the upset weld zone centrally of the nose portions to repeat the sequence. Removal of the flash material intermediate consecutive weld upsets is effected in alternate directions. The anvil edges may be staggered, angled or of helical form to enhance the shearing effect to clear the flash material from the upset weld zone.

14 Claims, 6 Drawing Sheets

COLD PRESSURE WELDING METHOD AND MACHINE

This invention relates to a cold pressure welding method and a machine for carrying out such method.

According to the present invention there is provided a cold pressure welding method including positioning a first and a second workpiece with faces in axially abutting relationship in respective reciprocable, releasable, first and second clamp means, and reciprocating the clamp means alternately to apply and relax a welding pressure across the abutting faces to form an upset weld zone, in which material displaced as flash material at the upset weld zone is cleared from the weld zone intermediate successive reciprocations of the clamp means such that the cross-sectional area of the workpieces is maintained substantially constant between successive reciprocations of the clamp means applying and relaxing welding pressure.

According to a further aspect of the present invention there is provided a cold pressure welding machine including a main frame having a pair of side plates rigidly mounted on a base frame and braced apart by a plurality of guide rods, a pair of clamp bodies reciprocably mounted on the guide rods and each carrying a hydraulically actuable piston and cylinder assembly connected to effect reciprocal movement in a direction perpendicular to the guide rods of one of a pair of die halves positioned in the associated clamp body into and out of engagement with the other one of the pair of die halves secured to the associated clamp body, a plurality of tie rods extending through bores in the clamp bodies in a direction parallel to the guide rods and each connected to a piston and cylinder assembly hydraulically actuatable to move the clamp bodies the one toward the other, and means effective to urge the clamp bodies apart.

The invention will now be described, by way of example, with reference to the accompanying, partly diagrammatic drawings, in which.

Figure 1:
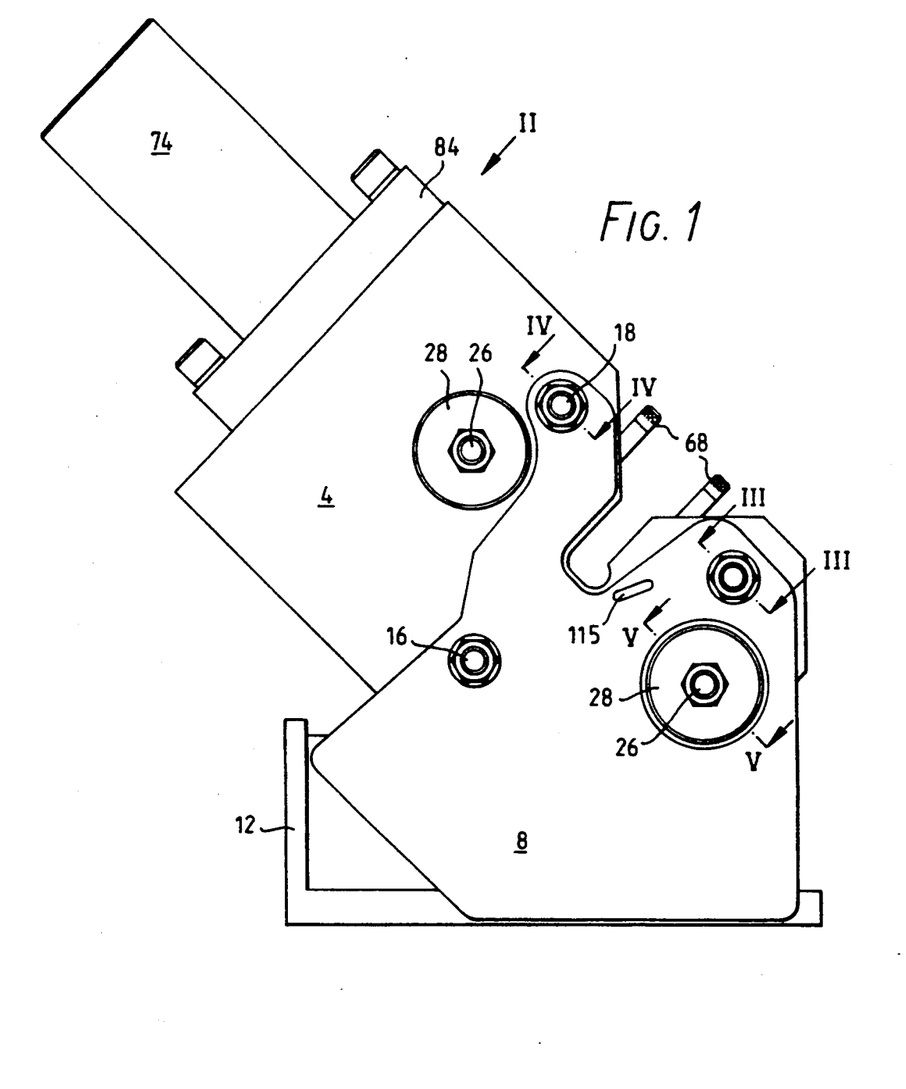
FIG. 1 is a side elevation of a cold pressure welding machine, with hydraulic pipework omitted.
Figure 2:
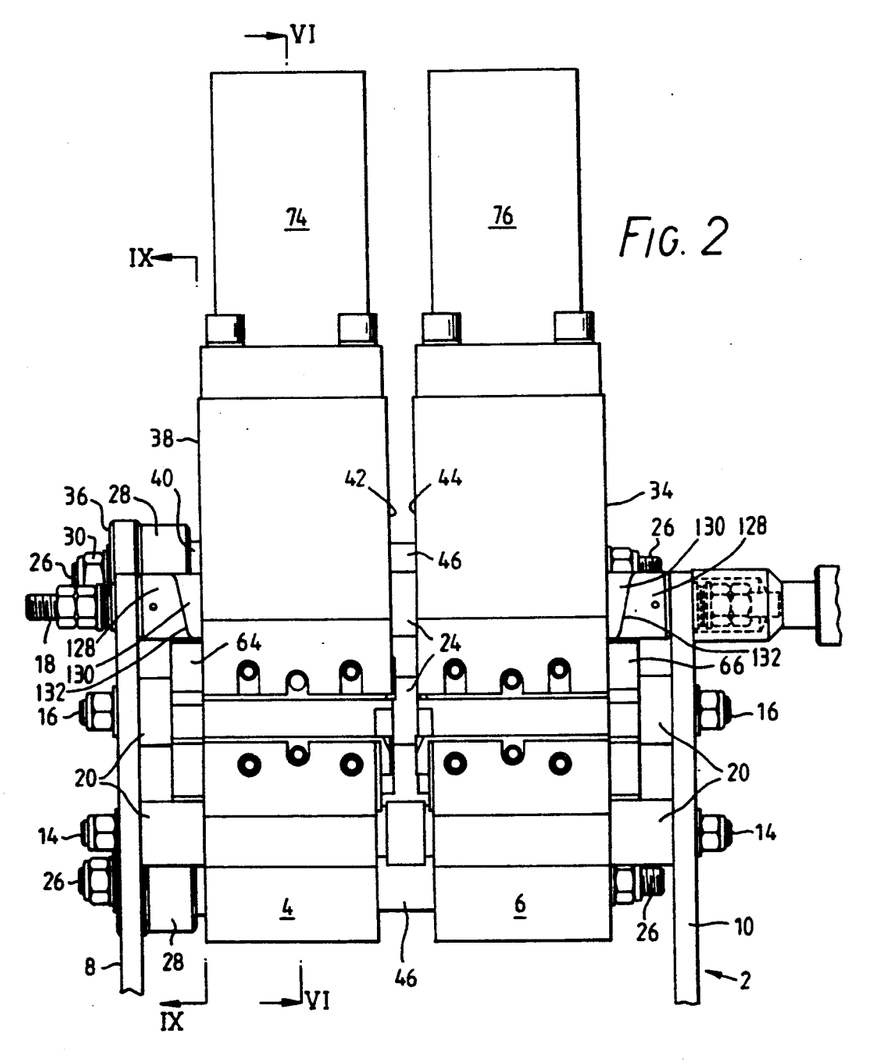
FIG. 2 is a front elevation of the machine shown in FIG. 1 and taken in the direction of the arrow II.
Figure 3:
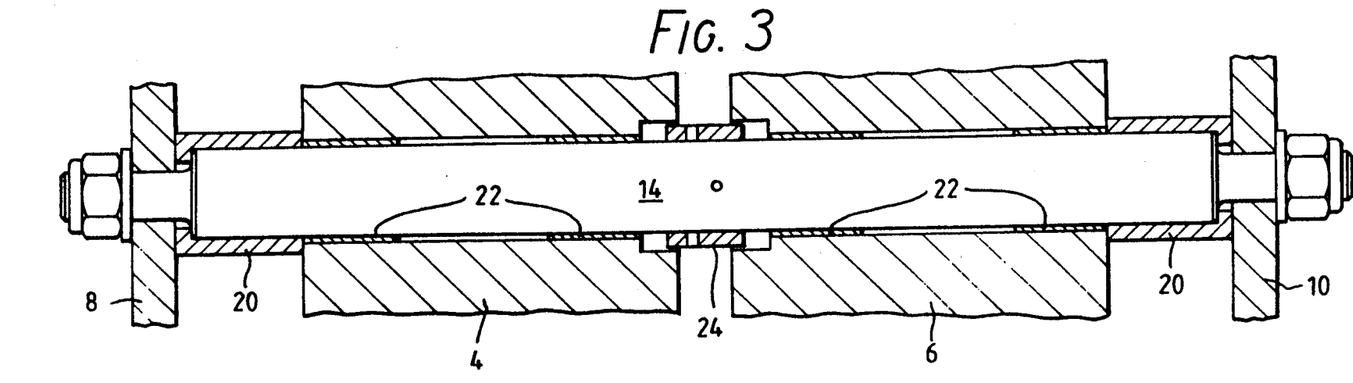
FIG. 3 is a cross-sectional elevation to an enlarged scale of a portion of the machine taken on the line III—III in FIG. 1.

The pressure welding machine includes a main frame 2 having mounted thereon, for horizontal reciprocal movement, a pair of clamp bodies 4,6. The main frame includes a pair of side plates 8, 10 rigidly secured to a base frame 12 and braced apart with three guide rods 14,16,18. The clamp bodies 4,6 are reciprocably positioned on the guide rods 14, 16, 18, which extend through bores in the clamp bodies. As shown in FIG. 3 the guide rods 14, 16 are provided with spacers 20 serving as backstops positioned intermediate the respective clamp body 4, 6 and the adjacent side plate 8, 10 and bushes 22 intermediate the guide rods and the clamp bodies. The bores in the clamp bodies are counter-bored at the adjoining faces to receive a single locating spacer 24.

Figure 4:
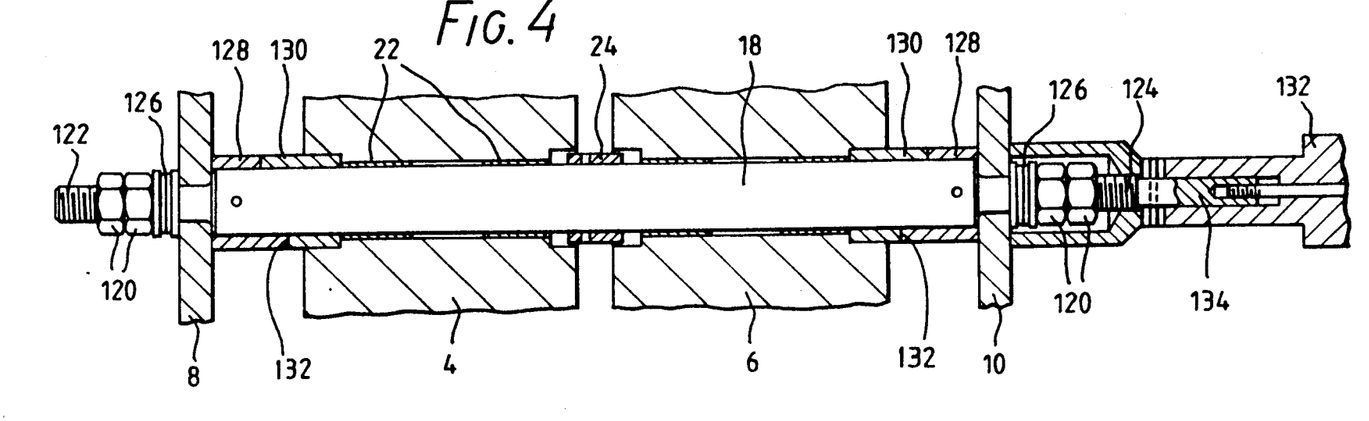
FIG. 4 is a cross-sectional elevation to an enlarged scale of a portion of the machine taken on the line IV—IV in FIG. 1.

As shown in FIG. 4, to facilitate the utilization of the machine for a range of workpiece diameters, a helical cam arrangement is provided in conjunction with the guide rod 18 to adjust the throw of the clamp bodies 4, 6 by adjusting the axial length of spacers 2 serving as backstops. Nuts 120 on threaded ends 122, 124 of the guide rods 18 are positioned against spring washer assemblies 126 bearing against the outer faces of the side plates, 8,10 whilst spacers 128 respectively intermediate the inner face of the side plates 8, 10 and the associated clamp body 4, 6 are formed in two portions 128, 130 co-acting at abutting helical faces 132, the axially outer portion 128 being pinned to the guide rod 18 and the axially inner portion 130 being a press fit in a counter-bore in the associated clamp body 4,6. A knurled adjustment knob 132 is secured on an extension 134 on the end 124 of the guide rod 18 and is rotatable to effect rotation of the guide rod through a limited arc. With rotation of the guide rod 18 respective outer portions 128 of the spacers rotate relative to the inner portions 130 to vary the effective length of the spacer and thereby limit the outward travel of the associated clamp body 4, 6 during reciprocatory movement. A graduated scale (not shown) relating rotation of the knurled knob to the workpiece diameter is provided, as are retaining means (also not shown) to prevent rotation of the guide rods during operation of the welding process.

Figure 5:
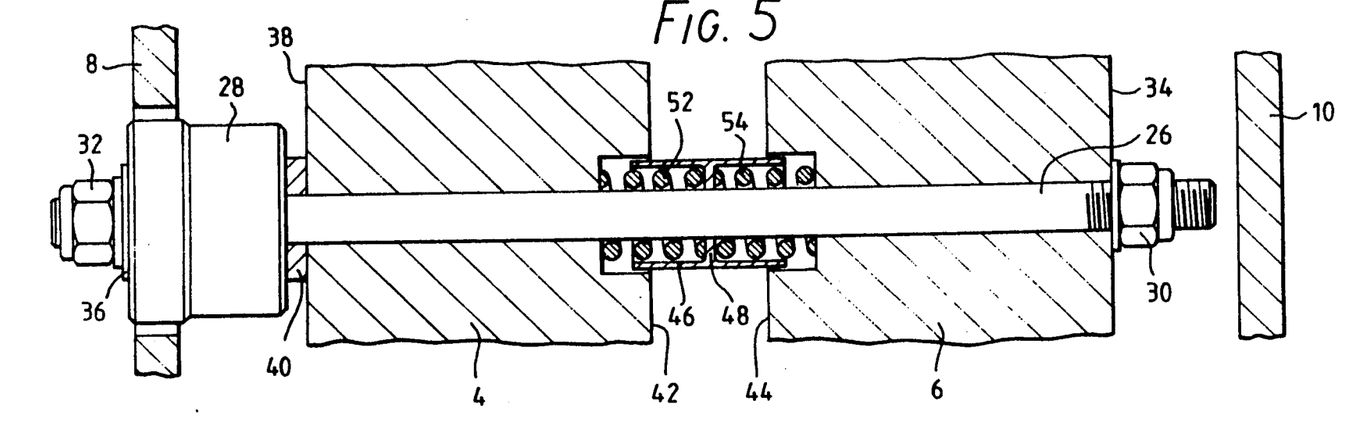
FIG. 5 is a cross-sectional elevation to an enlarged scale of a portion of the machine taken on the line V—V in FIG. 1.
Figure 6:
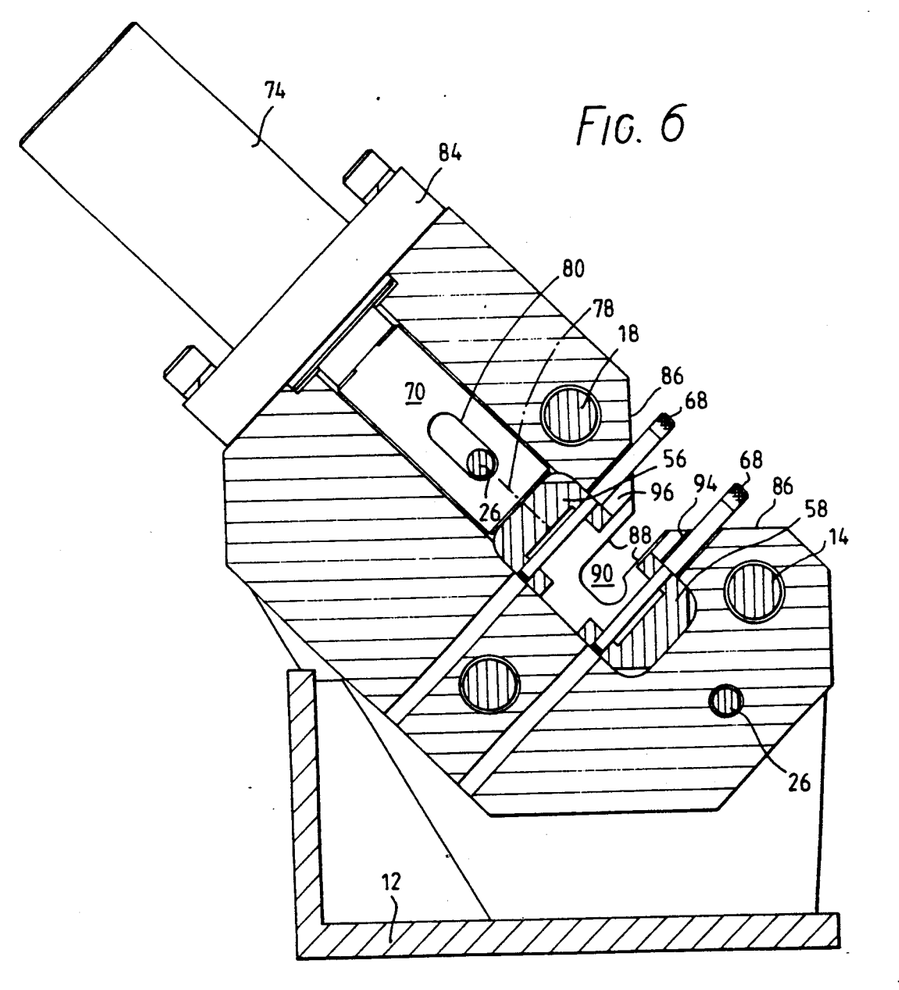
FIG. 6 is a cross-sectional side elevation taken on the line VI—VI of FIG. 2 and omitting a set of dies.
Figure 7:
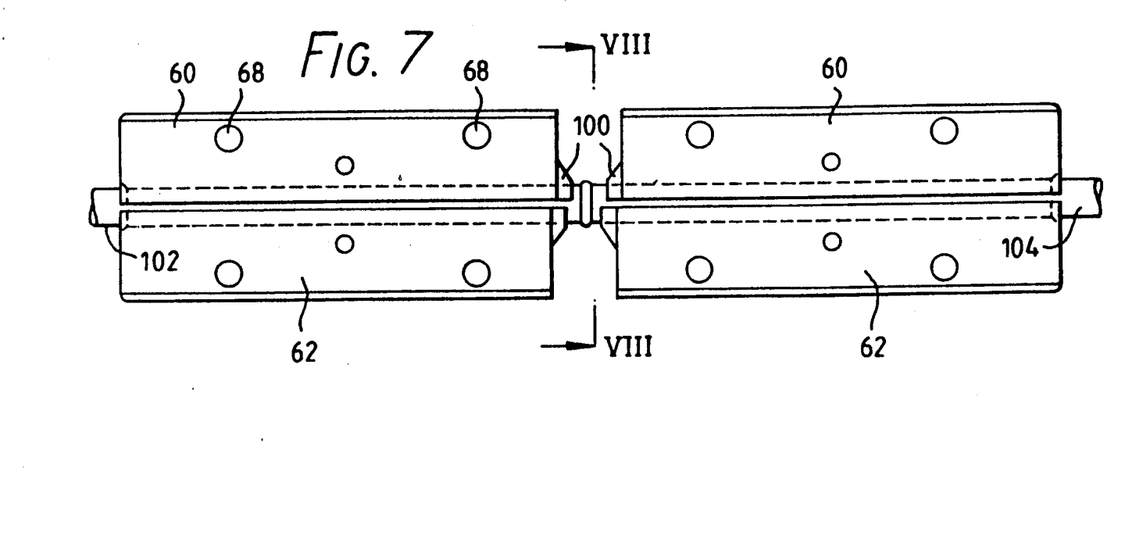
FIG. 7 is a front elevation of a set of dies and first and second workpieces.
Figure 8:
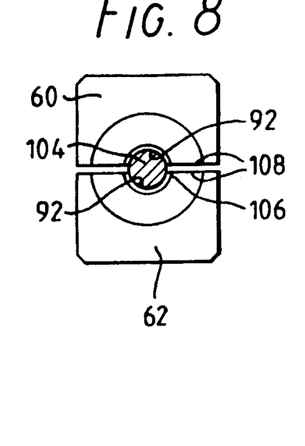
FIG. 8 is an end elevation of a pair of die halves taken on the line VIII—VIII of FIG. 7.

As shown in FIG. 5, a pair of tie rods 26, each carrying a hydraulically actuated, welding piston and cylinder assembly 28, also extend through bores in the clamp bodies on axes parallel to the guide rod axes. The ends of each tie rod 26 are threaded and are fitted with retaining nuts 30, 32 and washers respectively abutting an outer face 34 of the clamp body 6 and an outer face 36 of the associated welding piston and cylinder assembly 28, which, in turn, is spaced from the outer face 38 of the other clamp body 4 by a spacer 40. At the adjacent inner faces 42, 44 of the clamp bodies 4,6, the tie rod bores are counter-bored to receive a return spring cylinder 46 having a central internal flange 48 embracing the tie rod with coil compression springs 52, 54 extending from the respective faces of the internal flange 48 to the base of the associated counter-bore to bias the clamp bodies 4, 6 apart. The axes of the tie rods 26 lie in a plane inclined at an angle of 45° to the base and as shown in FIGS. 6, 7 and 8 each clamp body 4, 6 is slotted in alignment with the plane to receive a pair of clamp jaws 56, 58 carrying a die set comprising respective upper and lower die halves 60, 62. The clamp jaws are located in the respective clamp bodies by means of thrust plates 64, 66 (FIG. 2) secured, in register with the clamp jaws, to the outer faces 38, 34 of the clamp bodies 4, 6. The die halves 60, 62 are secured in the respective clamp jaws by pairs of die pins 68 and provision is made for positioning an extractor pin to facilitate extraction of the die halves when required.

Each clamp body 4, 6 is bored on an axis lying on the plane containing the tie rod axes and perpendicular to those axes, respectively to receive piston rods, 70, connected to double acting, hydraulically actuated, clamping piston and cylinder assemblies 74, 76. The respective piston rod 70, is secured to an associated clamp jaw 56 by means of a pair of socket head capscrews the axis 78 of one of which is indicated in chain dotted line in FIG. 6 and is formed with a slot 80 to enable the tie rod 26 to extend through the piston rod whilst enabling the piston rod to be reciprocable. The clamping piston and cylinder assemblies 74, 76 are secured in position on the associated clamp bodies on upper thrust blocks 84. A "Vee" groove 86 is provided in an inclined front face of each clamp body and extends into a slot 88 with an enlarged base 90 in aligment with grooves 92 in the dies 60, 62 for wire or rod workpieces. The clamp jaws 58 and die halves 62 nearer the base are held captive in the clamp bodies 4, 6 by virtue of the die pins 68 positioned in bores 94 in the clamp body exiting on one of the "Vee" groove faces. The upper clamp jaws 56 and die halves 60 are located in the clamp bodies 4, 6 by virtue of being secured to the piston rods 70, thereby permitting reciprocating movement, the clamp bodies being formed with recesses 96 at the "Vee" groove to accommodate the reciprocating movement of the die pins 68 securing the respective die halves 60 in the clamp jaws 56.

The upper and lower die halves 60, 62 of the die set are each formed at the welding end face with a protruding nose portion 100 providing anvil edges for effecting welding flash removal. In each die set one die half is made slightly longer than the other with the longer dimensioned die half in one set being axially aligned with the shorter dimensioned die half in the co-acting set to enhance the effect of the process. The grooves 92 in the die halves are slightly roughened by spark erosion to enhance gripping of a cylindrical wire or rod workpieces 102, 104. The axial edges 106 of the grooves in the die halves are relieved with a 5° flat and the abutting faces 108 of the die halves are machined away by a depth of 0.1 mm to enhance the gripping process.

In an alternative arrangement (not shown) the die halves of the die set are all of identical shape, each having the same length dimension and having the end surface of the protruding nose portion machined either in the form of a helical surface or, as a cheaper approximation thereto, to lie in a plane perpendicular to the axial face containing the groove and inclined at approximately 5° to the radial plane. On assembly into a set, it will be appreciated that the abutting end surfaces of the nose portions of the upper die halves will thus be inclined at approximately 10° to the abutting end surfaces of the nose portions of the lower die halves. Thus the anvils formed at axially adjoining nose portions are inclined to the axis of the workpiece and welding flash removal is effected by a force having a circumferential component, the circumferential force arising at the upper jaws being opposed to that arising at the lower jaws, thereby reducing a liability that the workpiece might be deformated by the flash removal process.

The welding piston and cylinder assemblies 28 and the clamping piston and cylinder assemblies 74, 76 are connected through hydraulic lines and valves to a high pressure hydraulic fluid pump (not shown).

The valves are operable to supply hydraulic fluid to the welding and the clamping piston and cylinder assemblies 28 and 74, 76 selectively to produce reciprocating movement of the jaws both in a direction parallel to the die grooves 92 to produce a welding force and direction prependicular to the die grooves to produce a clamping force.

Figure 9:
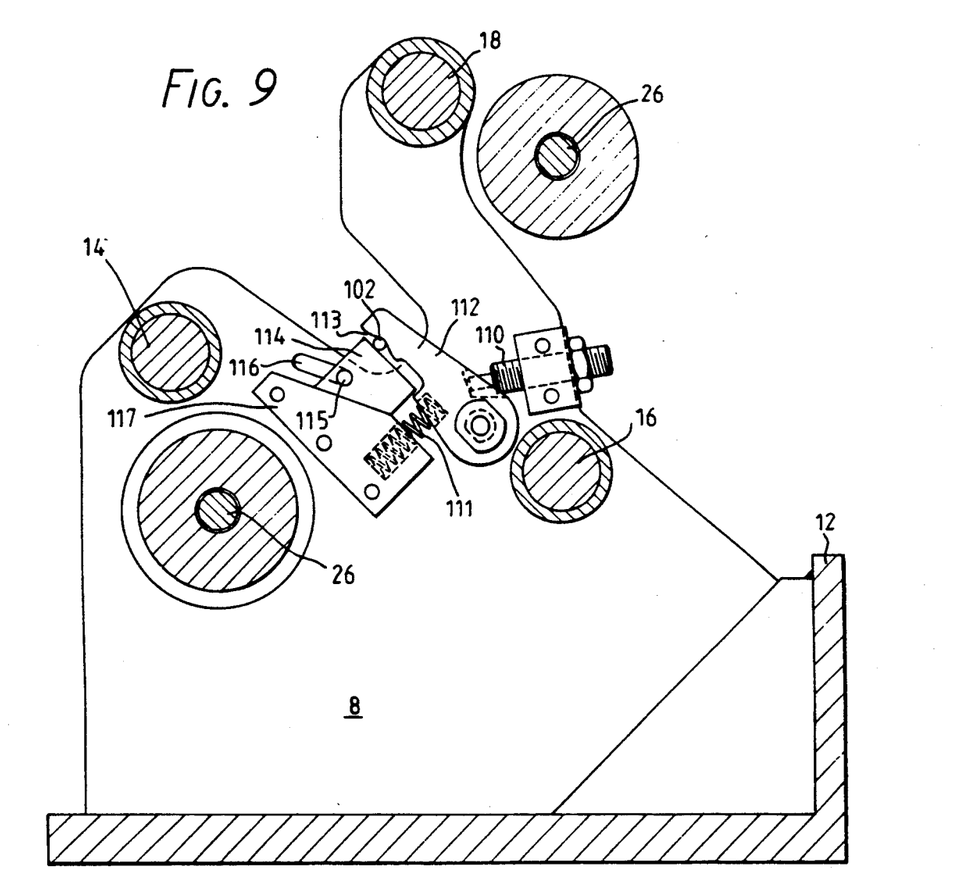
FIG. 9 is a cross-sectional side elevation to an enlarged scale taken on the line IX—IX of FIG. 2.

As shown in FIG. 9, auxiliary clamping means are provided by a hydraulically actuated plunger assembly 110 positioned on the inner face of each of the side plates which actuates, against the bias of a spring 111, a lever 112 pivotted on the associated side plate 8, 10. A nose portion of the lever is formed with a wide, shallow, notch 113 adapted to clamp the fed wire or rod 102 on an anvil 114, the location of which may be altered through a limited range to accommodate a range of diameters of the fed wire or rod, the anvil 114 being secured to the associated side plate by a retaining bolt 115 extending through a slot 116 in the side plate and being slidable along a ramp plate 117 secured to the side plate. The notches are arranged in alignment with the grooves in the die halves and respectively serve to support and, in an engaged position, to restrain axial movement of the first and second fed wires or rods 102, 104 relative to the associated dies.

In operation, to butt weld together the ends of two wire or rod workpieces 102, 104 by a cold pressure welding process, die halves 60, 62 are selected with grooves 92 appropriate to the cross-section of the workpieces and secured in the clamp jaws 56, 58 by means of the die pins 68. The workpieces are then loaded into the die grooves 92 by insertion either axially or through the slot 88 at the base of the "Vee" groove 86, the plunger assemblies 110 of the auxiliary clamping means and die halves 60, 62 being in a dis-engaged and fully open position, the die halves being, in addition, in a fully horizontally retracted position. Locating the ends of the wires or rods in relation to the welding end faces of the dies is achieved by moving the two pairs of die halves to a partially closed position, axially moving the first wire or rod in the first pair of die halves to a position with the end face midway between the first and second pair of die halves, moving the first pair of die halves to a clamping position and inserting the second wire or rod into the second pair of die halves to abut the end face thereof against the end face of the first wire or rod and initiating the welding procedure which has as a first action the moving of the second pair of die halves into a clamping position.

Initiation of the welding process is achieved by applying hydraulic fluid at elevated pressure through solenoid operated valves actuated in predetermined sequences, to the welding piston and cylinder assemblies 28 and to the clamping piston and cylinder assemblies 74, 76.

Following moving the second pair of die halves to a clamping position, the welding piston and cylinder assembly 74 operates to urge the first pair of die halves and the end face of the first wire or rod 102 and the second pair of die halves and the end face of the second wire or rod 104, towards each other (since the welding piston and cylinder assemblies 28 are free to move axially) producing partial upsetting and welding of the end faces together. On the inward stroke upon the end faces of the nose portions 100 coming within a pre-determined minimum distance of each other, of approximately 2.5 mm, the pressure at the welding piston and cylinder assemblies 28 is maintained for a further one second and then the hydraulic pressure at both the welding and the clamping piston and cylinder assemblies 28, 74, 76 relaxed to about one fifth of maximum pressure. The second pair of die halves is then actuated to allow slippage of the workpiece 104 whilst the first pair of die halves is moved to a clamping position and full hydraulic pressure applied to the welding piston and cylinder assemblies 28. This has the effect that the end faces of the nose portions 100 are moved towards each other to a position approximately 0.5 mm apart and that the partially welded workpiece is moved axially in relation to the end faces of the nose portions 100 of the second pair of die halves which impinge upon flash material produced at the weld and clear the flash material from the weld zone by shearing. The first pair of die halves are then moved to a partially open position, the welding piston and cylinder assemblies 28 vented to tank and the pairs of die halves moved axially to a retracted position by the action of the springs 52, 54 in the return spring cylinders 46. As the pairs of die halves are moved to a partially open position, the plunger assemblies 110 of the auxiliary clamping means are moved to effect gripping of the partially welded workpiece which thus remains stationary during axial retraction of the die halves. At the outer limit of axial retraction, the pairs of die halves are moved to the clamping position and the auxiliary clamping means opened. Welding pressure is then re-applied to effect a further upset at the weld zone until the end faces of the nose again come within the predetermined minimum distance of each other. The flash material clearance sequence is then repeated, but in alternate cycles maintaining the second pair of die halves in the clamping position and allowing slippage of the workpiece to occur through the first pair of die halves, so that the flash material is cleared in the opposite direction from the previous movement and the weld zone is maintained between the end faces of the nose portions 100.

Finally, upon achieving a complete welding together of the workpieces 102, 104, flash material is stripped from the workpieces utilising the foregoing cycle in which the workpiece is held in a clamped position in one pair of die halves and allowed to slip through the other pair of die halves, to strip the flash material from the welded workpiece.

A reciprocation cycle frequency of between 5 and 10 reciprocations per minute has been found to be effective.

Normally, four or five reciprocation cycles are sufficient to achieve a full weld. However, since the flash material is cleared from the weld zone as part of each cycle thereby avoiding any increase in cross-sectional area due to build-up of material at the weld zone, the reciprocation cycles may be continued without any need to increase power input until the operator is satisfied that a full weld has been achieved.

Finally, hydraulic fluid supply to the welding piston and cylinder assembly is discontinued and the hydraulic fluid supplies to the clamping piston and cylinder assemblies 72, 74 arranged to move the first and second pair of die halves to a fully open position allowing removal of the welded-up workpiece.

The valves of the hydraulic system are solenoid operated and sequenced utilising signals input from an electronic timer and position sensing switches on the clamp bodies and piston rods connected to the clamp jaws.

It has been found that successful welds may be accomplished in copper wires or rods of up to approximately 10 millimetres diameter and in aluminium wires or rods of up to approximately 19 millimetres diameter. Alloys of copper and aluminium and other non-ferrous materials may also successfully be welded. Where more difficult material is involved, the arrangement of the clamp bodies facilitates the provision of electrical heating of the workpieces immediately prior to initiating the welding process.

It will be appreciated that the process is not restricted to workpieces of circular cross-section or of extended axial form provided that at least one workpiece is of a form embraceable by, and advanceable through, an associated clamping die.

It will also be appreciated that by clearing the flash material from the weld zone between successive upset welding strokes the cross-sectional area at the upset zone is maintained substantially constant and that thus the required upset welding pressure will be substantially the same for successive strokes.

We claim:

1. A method of effecting a cold pressure weld including positioning a first and a second workpiece with faces in axially abutting relationship in respective axially reciprocable, releasable, first and second clamp means, and axially reciprocating the first and second clamp means alternately to apply, in a clamping position, and relax, in a released position, a welding pressure across the abutting faces to form an upset weld zone, characterized in that material displaced as flash material at the upset weld zone is cleared from the weld zone intermediate successive axial reciprocations of the first and second clamp means applying welding pressure, including axially moving the first and second workpieces relative to one of the first and second clamp means end faces by releasing one of the clamp means and maintaining the other of the clamp means in a clamping position and axially reciprocating the first and second clamp means towards each other, such that the cross-sectional area of the workpieces is maintained substantially constant between successive axial reciprocations of the first and second clamp means applying and relaxing welding pressure.

2. A method of effecting a cold pressure weld as claimed in claim 1, characterized in that the flash material is cleared from the upset weld zone by axial movement of the first and second workpieces relative to one of the end faces of the first and second clamping means in a continuation of the axial movement of the first and second clamp means towards each other during an initial part of which axial movement the welding pressure is applied.

3. A method of effecting a cold pressure weld as claimed in claim 1, characterized in that the flash material is cleared from the upset weld zone by shearing forces generated by axial movement of the first and second workpieces relative to one of the end faces of the first and second clamping means in alternate sequences of axially moving the first and second workpieces in relation to the first clamping means and in relation to the second clamping means intermediate successive axial reciprocations of the first and second clamping means applying and relaxing welding pressure.

4. A method of effecting a cold pressure weld as claimed in claim 3, characterized in that the shearing forces have circumferential components.

5. A cold pressure welding machine characterized in that the machine includes a main frame (2) having a pair of side plates (8, 10) rigidly mounted on a base frame (12) and braced apart by a plurality of guide rods (14, 16, 18), a pair of clamp bodies (4, 6) reciprocably mounted on the guide rods (14, 16, 18) and each carrying a hydraulically actuable piston and cylinder assembly (74, 76) connected to effect reciprocal movement in a direction perpendicular to the guide rods (14, 16, 18)

of one of a pair of die halves (60, 62) positioned in the associated clamp body (4, 6) into and out of engagement with the other one (62) of the pair of die halves secured to the associated clamp body (4, 6) a plurality of tie rods (26) extending through bores in the clamp bodies (4, 6) in a direction parallel to the guide rods (14, 16, 18) and each connected to a piston and cylinder assembly (28) hydraulically actuatable to move the clamp bodies (4, 6) the one toward the other and means (52, 54) effective to urge the clamp bodies apart.

6. A cold pressure welding machine as claimed in claim 5, characterized in that resilient means (52, 54) positioned intermediate the clamp bodies (4, 6) are arranged to urge the clamp bodies apart.

7. A cold pressure welding machine as claimed in claim 5, characterized in that hydraulically actuated auxiliary clamping means are formed with a gripping face (113) located to co-act with an anvil (114) positioned on each side plate (8, 10) in alignment with the die halves (60, 62).

8. A cold pressure welding machine as claimed in claim 5, characterized in that an access slot (86, 88, 90) is provided in each clamping body (4, 6) at an angular inclination of approximately 45° to the base plate (12) and the axis of the associated piston and cylinder assembly (74, 76) connected to the die half (60) extends perpendicular to the slot.

9. A cold pressure welding machine as claimed in claim 5, characterized in that welding end faces of respective die halves (60) and (62) of the pairs of die halves are formed with nose portions (100) having anvil edges adapted to effect by a shearing action removal of welding flash from a workpiece (102, 104) located between the pairs of die halves (60, 62) by relative axial movement of the anvil edges and the workpiece.

10. A cold pressure welding machine as claimed in claim 9, characterized in that the anvil edge on one of the die halves (60) of the pair of die halves (60, 62) is spaced axially from the anvil edge on the other of the die halves (62).

11. A cold pressure welding machine as claimed in claim 9, characterized in that the anvil edges extend at an inclination to a radial plane through the workpieces.

12. A cold pressure welding machine as claimed in claim 11, characterized in that the anvil edges extend helically.

13. A cold pressure welding machine as claimed in claim 11 characterized in that the nose portions (100) of the die halves of each pair of die halves (60, 62) are of identical form.

14. A cold pressure welding machine as claimed in claim 5, characterized in that spacer means (128, 130) positioned on one of the guide rods (18) intermediate the side plates (8, 10) and the clamp bodies (4, 6) and arranged to limit outward movement of the clamp bodies toward the adjacent side plate are adjustable to vary the limit of outward movement.

* * * * *